United States Patent [19]

Hörmann et al.

[11] 4,129,344
[45] Dec. 12, 1978

[54] BEARING RACE RING WITH LUBRICANT AND COOLING CHANNELS

[75] Inventors: Karl Hörmann, Dittelbrunn; Hans Weigand, Schweinfurt, both of Germany

[73] Assignee: Kugelfischer Georg Schäfer & Co., Schweinfurt, Germany

[21] Appl. No.: 728,191

[22] Filed: Sep. 30, 1976

[30] Foreign Application Priority Data

Dec. 12, 1975 [DE] Fed. Rep. of Germany ....... 2555923

[51] Int. Cl.² .............................................. F16C 1/24
[52] U.S. Cl. ..................................... 308/187; 308/216
[58] Field of Search ............... 308/187, 196, 202, 205, 308/216, 76, 217, 77, 218, 78, 236; 29/148.5 R

[56] References Cited

U.S. PATENT DOCUMENTS

| | | | |
|---|---|---|---|
| 3,179,478 | 4/1965 | Readdy | 308/187 |
| 3,350,147 | 10/1967 | Hingley | 308/187 |
| 3,746,407 | 7/1973 | Stiles et al. | 308/187 X |

Primary Examiner—Trygve M. Blix
Assistant Examiner—Douglas C. Butler
Attorney, Agent, or Firm—Karl F. Ross

[57] ABSTRACT

A bearing race ring, especially for high-speed applications, e.g. in jet engines, turbines and high-speed power plants, comprises an annular metallic body formed along one of its inner or outer surfaces with axially extending grooves which are inclined to the axis of the ring. Preferably each groove begins at a level at which an adjacent groove terminates and the angle which the groove makes with the longitudinal axis is defined by the formula $$\tan \alpha = \frac{d \cdot \pi}{n \cdot b}$$

wherein $\alpha$ is the aforementioned angle, d is the diameter of the surface provided with the groove, n is the number of grooves and b is the width of the ring.

5 Claims, 8 Drawing Figures

BEARING RACE RING WITH LUBRICANT AND COOLING CHANNELS

FIELD OF THE INVENTION

The present invention relates to a bearing-race ring, especially for high-speed applications, and more particularly to a roller-bearing race ring for jet engines, turbines and like power plants operating at high angular velocities.

BACKGROUND OF THE INVENTION

German Published Application (Auslegeschrift) DT-AS 1 905 462 describes a roller bearing for jet power plants, i.e. jet engines or turbines, in which the bore surface of the inner race ring is provided with axially extending grooves which serve to conduct lubricant and as cooling channels. The lubricant thus flows beneath the bearing and can be passed through radial bores to the active surfaces of the bearing to be lubricated.

Since jet engines operate at high angular velocities and temperatures, high centrifugal forces and thermal-expansion forces arise, the bearing being very firmly shrunk onto the shaft.

It has been found that with rings with axially extending lubricating grooves, of the type described in the aforementioned publication, the centrifugal forces and shrinkage stresses impart an undulating characteristic to the active (running) surface of the bearing-race ring.

Since the cross-section of the axially grooved bearing ring subjected to tension is not constant, there arise at the groove locations elastic flattenings which affect the useful life of the bearing highly detrimentally, especially since the roller bodies and race surfaces wear quite rapidly.

Furthermore, such race rings produce vibrations and noise which are disadvantageous and the fabrication of the axially extending grooves presents an expensive machining process which is also time-consuming.

OBJECT OF THE INVENTION

It is the object of the present invention to provide a ring, especially a bearing-race ring for high-speed roller bearings, wherein the aforementioned disadvantages are obviated, which has low material cost, is easily fabricated and is free from the tendency toward surface deformation and flattening.

SUMMARY OF THE INVENTION

This object is attained, in accordance with the present invention, in a roller-bearing race ring which comprises a circular body having an inner surface and an outer surface, one of these surfaces being formed as a bearing race (running surface) engageable with roller bodies while the other surface is receivable on one of the structures (shaft or rotor or housing) adapted to be rotated relative to one another. The other surface, according to the present invention, is formed with a multiplicity of grooves extending across the axial width of the bearing-race body and inclined to the axis of rotation of the bearing and hence the axis of the ring.

According to a feature of the invention, each groove begins at a level which corresponds substantially to the level which corresponds substantially to the level at which a preceding groove terminates. The term "level" as used herein is intended to refer to position with respect to a generatrix of the ring. Thus the grooved surface can be defined by a generatrix parallel to the axis of the ring and each groove beings at one side of the ring along a given generatrix location at which a preceding groove ends. Put otherwise, an axial plane through the ring at the beginning of one groove is the plane at which the next groove ends.

More particularly, we prefer to incline the grooves at an angle $\alpha$ to the axis and, therefore, to the generatrix, the angle being defined by the formula:

$$\tan \alpha = \frac{d \cdot \pi}{n \cdot b}$$

wherein d is the diameter of the surface formed with the grooves, n is the number of grooves provided around the ring and b is the width (measured parallel to the axis) of the ring.

According to still another feature of the invention, each groove is in the center of the ring of a greater depth than its depth at the ends (axial extremities) of the ring. In addition or instead, each groove can have a depth greater at one axial end of the ring than at the other axial end of the ring.

Still another feature of the invention resides in offsetting the grooves of one half of the ring relative to the other half of the ring.

The grooves are formed, according to another aspect of the invention, by a side-milling cutter displaced or oriented with its axis inclined to the axis of the ring. The side-milling cutter can be advanced radially into the ring and, in addition, the ring and side-milling cutter can be shifted asymmetrically with respect to a median plane through the ring and perpendicular to the axis thereof, whereby one axial end of the groove is deeper than the other axial end thereof.

The inclined arrangement of the grooves according to the invention has been found quite surprisingly to ensure a uniform round race configuration, even though high stresses are applied to the ring and in spite of the fact that the fabrication of the ring is greatly simplified.

With the system of the present invention, moreover, the lubricant throughput can be significantly increased while, because of the inclined configuration of the grooves, the lubricant path lengths through the grooves and in contact with the ring are likewise increased to effect greater heat abstraction from the ring. The lubricant throughput can be increased still further if the pitch and cross-section of the groove is correspondingly widened.

The groove depth can be accommodated to the particular requirements of the ring, i.e. the grooves can be made deeper at certain critical locations, without increasing the cost of fabricating the ring.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
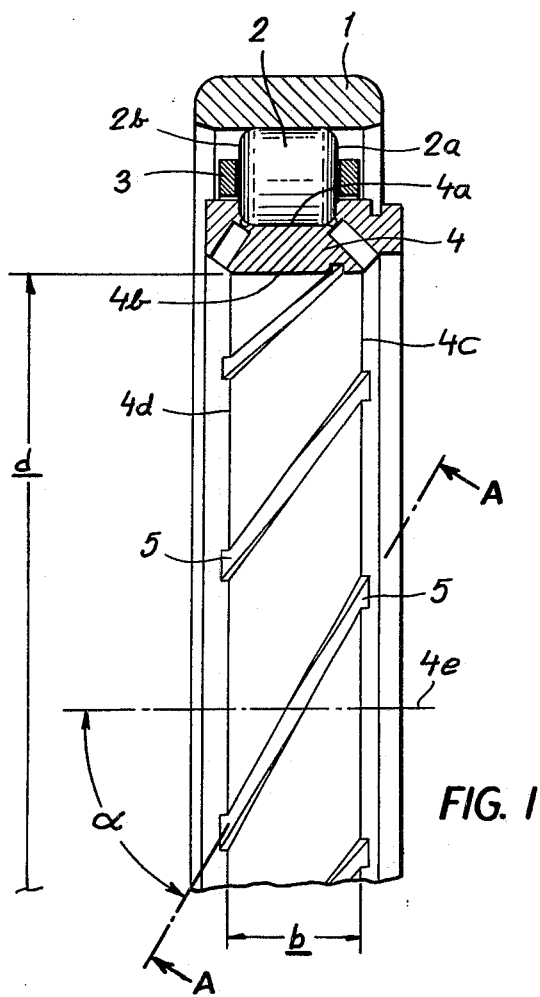
FIG. 1 is a partial axial cross-section through a cylindrical-roller bearing provided with inclined grooves in accordance with the present invention, in the inner race ring.

In the drawing discussed below, we have illustrated primarily inner race rings and bearings provided therewith in which the inner race rings are formed with grooved bores adapted to engage a shaft. However, all of the principles of the present invention are equally applicable to the outer race ring in which case the outer surface engaging a housing, rotor or the like can be formed with otherwise identical inwardly extending inclined grooves. Thus all of the principles described below with respect to the inner rings apply equally well to outer rings of the latter type.

The cylindrical-roller bearing illustrated in FIG. 1 comprises an outer ring 1, cylindrical-roller bodies 2, a cage as is customarily provided for the rollers 2 and represented at 3, and an inner race ring 4. The outer surface 4a of the inner race ring forms a bearing race upon which the rollers 2 run while the inner surface 4b or bore of the inner ring 4 is formed with grooves 5 inclined to the axis of the ring and hence to the generatrix of this otherwise cylindrical surface.

It is especially advantageous, in accordance with the invention, that each groove begins at one side 4c of the ring at the level at which the next groove ends at the opposite side 4d thereof, this arrangement providing throughout a uniform cross-section subjected to tensile stress so that no elastic flattening of the race surface can develop. The grooves can be inclined to the respective generatrices 4e at angles α (FIG. 1) defined by the formula:

$$\tan \alpha = \frac{d \cdot \pi}{n \cdot b}$$

in which d is the diameter of the grooved surface, b is the axial width of the grooved surface (the distance between 4c and 4d), and n is the number of grooves spaced around the inner circumference of the rim.

Advantageously, the grooves are formed by side-cutting millers rotatable about axes inclined to the axis of the rim. This cutter can be fed radially into the ring or the ring may be displaced radially relative to the cutter. This mode of fabricating the ring yields different groove configurations as illustrated in FIGS. 2, 3 and 4.

Figure 2:
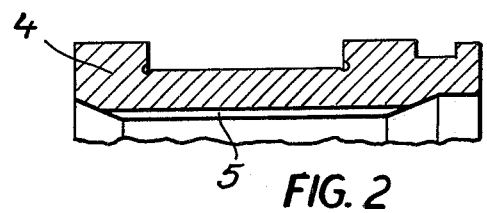
FIG. 2 is a cross-section taken along line A — A of FIG. 1.

A normal groove configuration as shown in FIG. 2 is achieved when the side-milling cutter is advanced, after being positioned for cutting the necessary groove depth, parallel to the cut or by the use of a side-milling cutter whose diameter is substantially equal to that of the inner diameter of the ring.

Figures 3, 4:
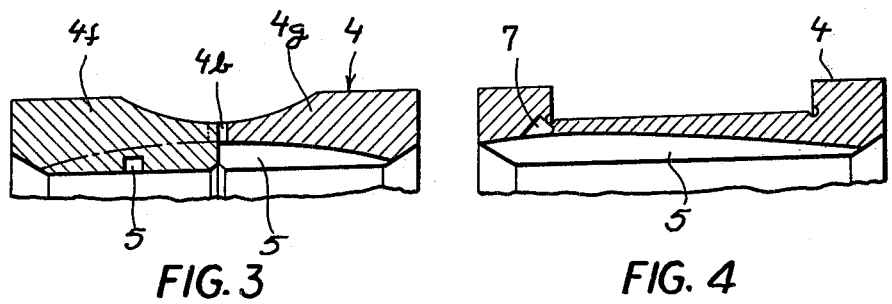
FIG. 3 is a cross-sectional view similar to FIG. 2 but corresponding to a section generally along the line B — B of FIG. 8 for another embodiment of the invention, namely, a three-point ball bearing having a bipartite inner ring.
FIG. 4 is a view similar to FIG. 2 illustrating another embodiment of the invention, also for cylindrical-roller bearings.

The groove configuration illustrated in FIG. 3 is obtained with a milling cutter of a correspondingly smaller diameter than the inner diameter of the ring surface and which is displaced radially relative to the ring. This configuration is especially advantageous for three-point ball bearings having bipartite inner rings, i.e. inner rings consisting of two halves 4f and 4g, as shown in FIG. 3, which adjoin along a median plane through the bearing ring and perpendicular to the axis thereof. At this junction radial bores 4b (FIG. 3) run from the deepest portions of the grooves 5 to the race surface.

Figure 5:
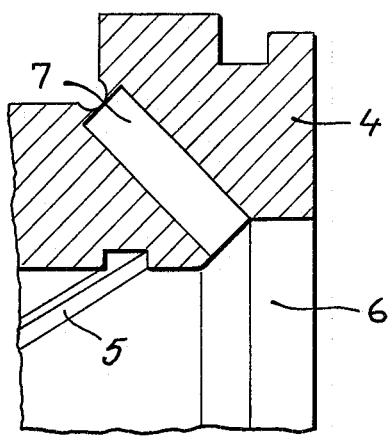
FIG. 5 is a detailed view of a portion of the ring of FIG. 1.

With cylindrical-roller bearings it is desirable to feed the lubricant to the end flanks of the cylindrical rollers and, to this end, the lubricant is supplied via the arrangement illustrated in FIGS. 1 and 5.

As can be seen from FIG. 5, the inclined grooves 5 open at each axial end of the bearing into annular chambers formed by stepping the inner bore of the inner ring, the chambers being represented at 6. Inclined bores 7, which lie in respective axial planes, run from the chambers 6 to the race surfaces 4a at each end 2a, 3b of the cylindrical-roller bearings 2.

The cooling of the bearing is also improved by the arrangement of FIGS. 1 and 5 since the inclined grooves form long cooling paths and the chambers 6 permit a high flow rate of the lubricant through the grooves and to the active bearing elements 3.

Figure 6:
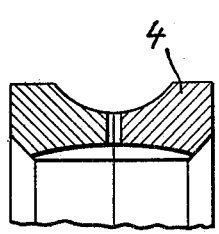
FIG. 6 is another view similar to FIG. 2, but illustrating a bipartite inner race ring for a ball bearing (three point ball elements)

FIG. 6 shows still another bipartite inner ring for a three-point ball bearing in which the grooves extend continuously across both halves of the inner ring and have their deepest points in the median plane of the ring. This system contrasts with that of FIG. 3 wherein the grooves 5 in both halves of the ring are inclined in opposite directions. The arrangement of FIG. 6 has the advantage that lubricant from both axial ends of the ring can be supplied to the radial bores which lie in the median plane.

Figure 7:
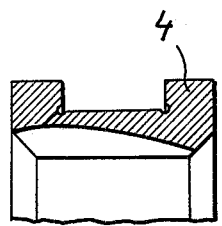
FIG. 7 is a partial axial section through a race ring for a cylindrical-roller bearing.

FIG. 7 shows an arrangement in which the grooves are deeper at one axial end of the bearing than at the other to facilitate the supply of lubricant to the grooves.

Figure 8:
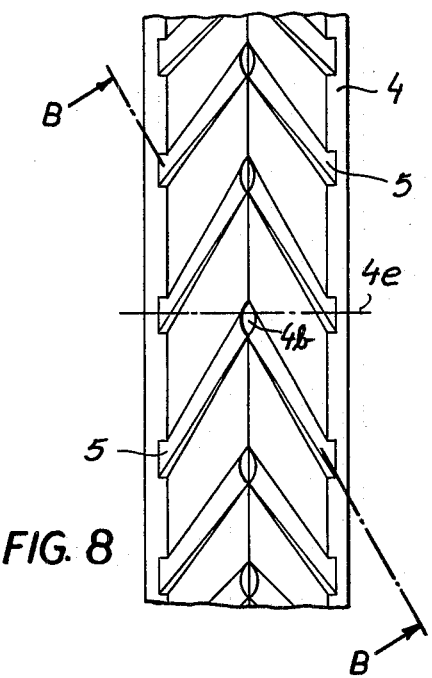
FIG. 8 is an elevational view from the interior of a portion of a three-point ball-bearing inner race ring of the type illustrated in FIG. 3.

FIG. 8 illustrates more clearly the arrangement of FIG. 3 in which the grooves of both halves of a divided or bipartite ring are inclined in opposite directions. This arrangement has been found to ensure an especially effective and uniform cooling and to facilitate lubricant flow to the bearing from both axial ends.

We claim:

1. A bearing ring comprising a circular body having a pair of axial ends, an inner surface and an outer surface opposite said inner surface, one of said surfaces having a configuration constituting a race for rolling elements of a bearing, the other of said surfaces being formed with a multiplicity of spaced-apart grooves inclined to the axis of said ring and running substantially from one end to the other end thereof, each groove terminates at a level substantially identical to that at which a successive one begins, said grooves are inclined at an angle α to the axis of said ring, said angle α being defined by the formula:

$$\tan \alpha = \frac{d \cdot \pi}{n \cdot b}$$

wherein d is the diameter of said other surface, n is the number of grooves circumferentially spaced therearound and b is the axial width of the ring across which said grooves extend, each of said grooves having a greater depth at a region intermediate said ends than at said ends, said body being bipartite and consisting of two halves adjoining along a median plane of the ring perpendicular to said axis, the grooves in said halves being inclined in opposite directions.

2. The ring defined in claim 1, further comprising bores extending from said grooves to said one of said surfaces.

3. The ring defined in claim 2 wherein the body is the inner race ring of a roller bearing and said other surface is the inner surface of said inner race ring.

4. The ring defined in claim 3 wherein said one of said surfaces is cylindrical and adapted to receive cylindrical-roller bodies.

5. The ring defined in claim 3 wherein said one of said surfaces is concave to form a race way for a three-point ball bearing.

* * * * *